(12) United States Patent
Simmons et al.

(10) Patent No.: US 7,269,854 B2
(45) Date of Patent: Sep. 11, 2007

(54) TRANSACTION SYSTEM FOR TRANSPORTING MEDIA FILES FROM CONTENT PROVIDER SOURCES TO HOME ENTERTAINMENT DEVICES

(75) Inventors: Selwyn D. Simmons, Alameda, CA (US); Carl J. Ludewig, Mill Valley, CA (US)

(73) Assignee: Selvyn D. Simmons, Mill Valley, CA (US)

( * ) Notice: Subject to any disclaimer, the term of this patent is extended or adjusted under 35 U.S.C. 154(b) by 949 days.

(21) Appl. No.: 09/789,780

(22) Filed: Feb. 20, 2001

(65) Prior Publication Data
US 2001/0039659 A1   Nov. 8, 2001
US 2006/0085821 A9   Apr. 20, 2006

Related U.S. Application Data

(63) Continuation of application No. PCT/US99/19108, filed on Aug. 19, 1999.

(60) Provisional application No. 60/097,678, filed on Aug. 23, 1998.

(51) Int. Cl.
*H04K 1/00* (2006.01)
*H04L 9/14* (2006.01)
*H04N 7/167* (2006.01)
*H04N 7/173* (2006.01)

(52) U.S. Cl. ......................... 726/29; 380/201; 725/31; 725/100

(58) Field of Classification Search ............... 725/2, 725/4, 5, 61, 87, 89, 100, 147, 31; 380/211, 380/201; 705/26; 713/201; 726/29
See application file for complete search history.

(56) References Cited

U.S. PATENT DOCUMENTS

| 5,619,247 | A |   | 4/1997 | Russo |
|---|---|---|---|---|
| 5,629,733 | A |   | 5/1997 | Youman et al. |
| 5,767,894 | A |   | 6/1998 | Fuller et al. |
| 5,778,187 | A | * | 7/1998 | Monteiro et al. ........... 709/231 |
| 5,790,174 | A |   | 8/1998 | Richard, III et al. |

(Continued)

OTHER PUBLICATIONS

Schneier, Bruce. Applied Cryptography. Second Edition. John Wiley & Sons, Inc. 1996. pp. 169-177.*

*Primary Examiner*—Emmanuel L. Moise
*Assistant Examiner*—Michael Pyzocha
(74) *Attorney, Agent, or Firm*—Freilich, Hornbaker & Rosen

(57) ABSTRACT

A system and method for enabling a user to request and download selected media files from distributed content provider sites via the Internet. The system includes a plurality of user sites each including a player/receiver housed in an enclosure having a simple user interface, a plurality of content provider sites, and a transaction server site. The player/receiver enables the user to connect to the transaction server via the Internet to access a program guide listing available media files. The user is then able to select a desired file and, via the player/receiver and Internet, request the transaction server to authorize download of the selected file. The file request along with file encryption and transfer instructions are sent from the transaction server via the Internet to the content provider site storing the requested file. Requested files are then dynamically encrypted by the content provider site and securely downloaded to the requesting player/receiver. The requesting player/receiver is uniquely capable of decrypting a downloaded file concurrent with playing back the file on a conventional home television set and/or audio system.

23 Claims, 13 Drawing Sheets

U.S. PATENT DOCUMENTS

| | | |
|---|---|---|
| 5,815,662 A | 9/1998 | Ong |
| 5,889,860 A * | 3/1999 | Eller et al. .................... 705/51 |
| 5,923,361 A | 7/1999 | Sutton, Jr. |
| 5,926,624 A * | 7/1999 | Katz et al. ................. 709/217 |
| 6,002,394 A * | 12/1999 | Schein et al. ................. 725/39 |
| 6,006,251 A * | 12/1999 | Toyouchi et al. ........... 709/203 |
| 6,016,348 A * | 1/2000 | Blatter et al. ............... 380/228 |
| 6,286,139 B1 * | 9/2001 | Decinque ...................... 725/5 |
| 6,338,044 B1 * | 1/2002 | Cook et al. ................... 705/14 |
| 6,343,284 B1 * | 1/2002 | Ishikawa et al. .............. 705/67 |
| 6,460,076 B1 * | 10/2002 | Srinivasan .................. 709/219 |
| 6,486,892 B1 * | 11/2002 | Stern .......................... 715/760 |
| 6,634,028 B2 * | 10/2003 | Handelman ................. 725/116 |
| 2002/0161716 A1 * | 10/2002 | Iwamura ...................... 705/59 |
| 2002/0178070 A1 * | 11/2002 | Leveridge .................... 705/26 |

\* cited by examiner

TRANSACTION SYSTEM FOR TRANSPORTING MEDIA FILES FROM CONTENT PROVIDER SOURCES TO HOME ENTERTAINMENT DEVICES

This application is a continuation of PCT Application US99/19108 filed on 19 Aug. 1999. Said PCT Application claims priority based on U.S. Provisional Application 60/097,678 filed on 23 Aug. 1998. This continuation application claims priority based on said PCT Application U.S. 99/19108 and on said U.S. Provisional Application 60/097, 678.

BACKGROUND OF THE INVENTION

This invention relates to systems for delivering digital media files (e.g., audio and/or video) from content provider sites to home user entertainment systems (e.g., television sets and/or audio equipment) via communications networks including public networks, e.g. Internet, and private networks, e.g., intranet and extranet.

Existing systems for transferring media files to the home user are typically complex, expensive to implement and maintain, lack sufficient security and flexibility, do not effectively utilize existing home entertainment infrastructure, and do not effectively leverage the open architecture of the Internet and standard communications protocols or encryption technologies. Generally, the limitations of not existing systems can be attributed to attempts to force a broadcast model onto communications network architectures that are designed to store and forward data as packets, rather than as continuous streams.

For example, so called "video on demand" systems deliver only video files for viewing and the infrastructure to enable transfer of those files to the home user is highly capital intensive. Moreover, such systems are typically difficult to scale since at any point in time, a unique stream must be dedicated to a particular user, from the video server to the users set top box. Since users can theoretically request video "broadcasting" at any time, the service provider must have sufficient capacity and communications bandwidth available at all times to insure that a program channel can be created whenever the user desires. Further, video on demand systems typically do not have the capability to access and transfer media files that reside on networks outside of the proprietary networks operated by the particular video on demand operator. This limits the number of titles that can be offered.

Special purpose home terminals are also known in the prior art for enabling home user access to the Internet or world wide web. These terminals require the home user to purchase and learn to use a special purpose device that does not leverage the user's current investment in home entertainment and communications infrastructure. Further, these devices do not facilitate effective storage and playback of media files downloaded from the Internet since they do not typically interface to conventional television sets or audio systems for viewing and listening, respectively. Other prior art involving streaming media via communications networks does not address the home user's need to select and acquire media files from the Internet, for example, without having to dedicate a computer to the task. Specifically, prior art associated with streaming media from the Internet to computers does not address the need to store and play back the streamed media at user selectable times via existing home entertainment systems that are already familiar to the home user.

SUMMARY OF THE INVENTION

This invention relates generally to a method and apparatus for enabling a user to acquire media files for playback (either limited or unlimited use) on television sets and audio systems typically found in the home. The acquisition of the media files forms part of a transaction initiated by a user via a communications network for enabling content providers to download requested media files to the user. The transaction is characterized by a procedure which debits a user's payment account and credits a content provider's receipt account. Embodiments of the invention enable (1) any of a plurality of home users to request selected media files for playback on a conventional home entertainment system and (2) any of a plurality of content provider sites to respond to the request to deliver media files to a requesting home user.

More particularly, the invention relates to a system in which each home user can communicate a transaction request via a local player/receiver and a communications network to a transaction server. The transaction request includes information identifying the home user and specifying a media file, e.g. by title or assigned code number. The transaction server then verifies the user's account information and initiates an electronic banking transaction. Additionally, the transaction server instructs the content provider media server storing the requested media file to download the file via the network to the requesting home user player/receiver.

A system in accordance with the invention can operate with various, public and private communications networks but its primary application is intended to be with the public Internet for delivering media files to a home user for playback via conventional television sets and audio systems.

Systems in accordance with the invention are generally characterized by the following features:

1. They are readily scalable and can accommodate a virtually unlimited number of content provider sites and home user sites communicating via the Internet using a standard protocol, e.g., TCP/IP;
2. The systems are open in the sense that they can support a variety of media file types;
3. The content provider sites operate to encrypt a media file in the course of downloading the file to a requesting home user site; and
4. Only the requesting home user site is able to decrypt the downloaded file.

Systems in accordance with the invention preferably include:

1. A transaction server which is capable of servicing multiple home user sites and multiple content provider sites via a communications network;
2. At least one home user site comprising a player/receiver subsystem for interactively communicating with the transaction server to request the download of media files for archive storage and/or playback via substantially conventional home entertainment equipment. The player/receiver subsystem is preferably implemented as a simple user friendly appliance;
3. At least one content provider site including a media file storage device and an encryptor for dynamically encrypting media files, directly to a requesting home user site. Only the targeted home user site is able to decrypt the downloaded media files to enable playback; and 4. Network connectivity devices for connecting the home user sites, the content provider sites, and the transaction server to the network.

In accordance with a preferred embodiment, the player/receiver subsystem enables the home user to connect to the transaction server via the communications network to access a program guide of available media files which can, for example, be displayed via the home user television set. The user is then able to interactively browse the displayed list and select desired files therefrom. The user then, via the player/receiver and communications network, requests the transaction server to deliver the selected files. After appropriate user authentication and account verification, the transaction server transmits a download authorization instruction to the content provider site storing the requested media files. Encoded media files are then dynamically encrypted by the content provider site and downloaded directly to the requesting player/receiver. The encrypted files can be decrypted solely by the requesting player/receiver. The user can also browse and select media files from web site based media title listings or print guide listings.

A preferred transaction server in accordance with the invention functions to (1) authenticate each player/receiver and process file requests therefrom and (2) maintain a list of available media files and their location at multiple content provider sites. Specifically, the transaction server arranges for the downloading of requested files from a content provider site directly to the requesting player/receiver. Files downloaded to the player/receiver are preferably stored either on the player/receiver's local or storage means, e.g., a hard disk drive, or on the player/receiver's archive storage means, e.g., removable storage media such as magnetic tape or recordable CD-ROMs.

A preferred encoder subsystem in accordance with the invention functions to encode audio and/or video files from their respective sources, e.g., professional recording equipment, and provide the resultant encoded files (e.g., MPEG) to the media server at the content provider site.

A preferred encryptor in accordance with the invention dynamically encrypts files stored on a media server based on instructions received from the transaction server. The encryption format uniquely targets the requesting player/receiver to prevent playback on any other device.

In typical use, the player/receiver first connects to the transaction server, transmits an identifier, including a unique locally generated encryption key and receives authentication from the transaction server. A list of available media files is then transmitted to the player/receiver which in turn displays the list as an interactive program guide or menu, preferably on a home television set. Once files are selected from the menu, the player/receiver requests the transaction server to download the selected files. The transaction server then processes the request by generating a transaction ID and instructions and transmits that information to the content provider site containing the requested files. The files are then dynamically encrypted by the encryptor at the content provider site and transmitted via the network directly to the requesting player/receiver which stores them locally. During playback, the player/receiver decrypts and decodes the files from the local storage device and outputs them for viewing and listening via the home user television set and/or audio system.

DESCRIPTION OF THE PREFERRED EMBODIMENTS

Figure 1:
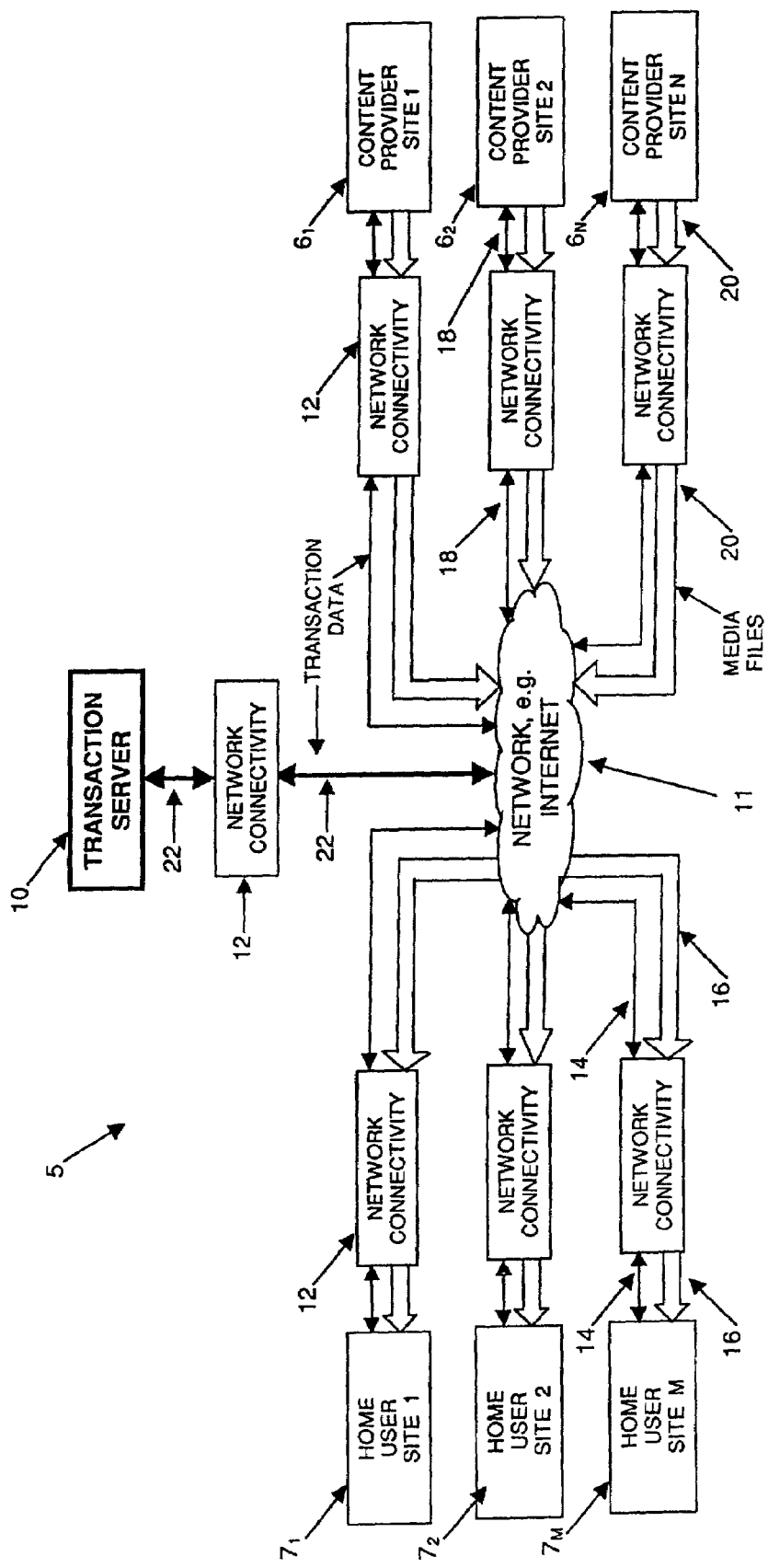
FIG. 1 is a block diagram showing the architecture of a preferred system is accordance with the invention.

Attention is initially directed to FIG. 1 which depicts a block diagram of a preferred system 5 in accordance with the invention. The system 5 is comprised of a plurality of content provider sites $6_1, 6_2, \ldots 6_M$, a plurality of home user sites $7_1, 7_2 \ldots 7_N$ and a transaction server site 10, all connected to a common communications network 11. In a preferred embodiment, the network 11 comprises the public Internet and connections to the Internet are formed via suitable broadband network connectivity devices 12, e.g., cable modems, digital subscriber line (DSL) modems, or very small aperture satellite (VSAT) Internet access systems. In alternative system embodiments, the network 11 could comprise other public or private networks, e.g. Intranet or Extranet. The "Internet" refers to a global network that facilitates the connectivity of computer-based systems typically using a common communications protocol known as Transmission Control Protocol/Internet Protocol (TCP/IP).

It is contemplated that in most applications of the invention, the home user sites and content provider sites will be widely geographically distributed. However, the invention is not restricted to wide physical separation amongst sites. For example only, the multiple home user sites can be distributed amongst multiple apartments in a single building. Moreover, the term "home" user is not intended to restrict the sites to residences but rather is used to refer to any type of end user.

FIG. 1 schematically depicts each home user site 7 connected to the network 11 (via a connectivity device 12) by both a bi-directional narrow arrow 14 and an incoming wide arrow 16. The narrow arrow 14 represents the flow path for digital transaction data to be discussed hereinafter. The wide arrow 16 represents the flow path for digital media files to be discussed hereinafter. Similarly, each content provider site 6 is shown connected to the network 11 via bi-directional narrow arrow 18 for transaction data flow and an outgoing wide arrow 20 for media file flow. The transaction server site is depicted as being connected to the network 11 by a bi-directional narrow arrow 22 for transaction data flow.

For clarity of presentation, no wide arrow is depicted in association with the transaction server site 10 because in typical applications, media files are not handled by the transaction server 10. However, it should be understood that, in fact, one of the content provider sites 6 could be physically located at the transaction server site 10.

Figure 2:
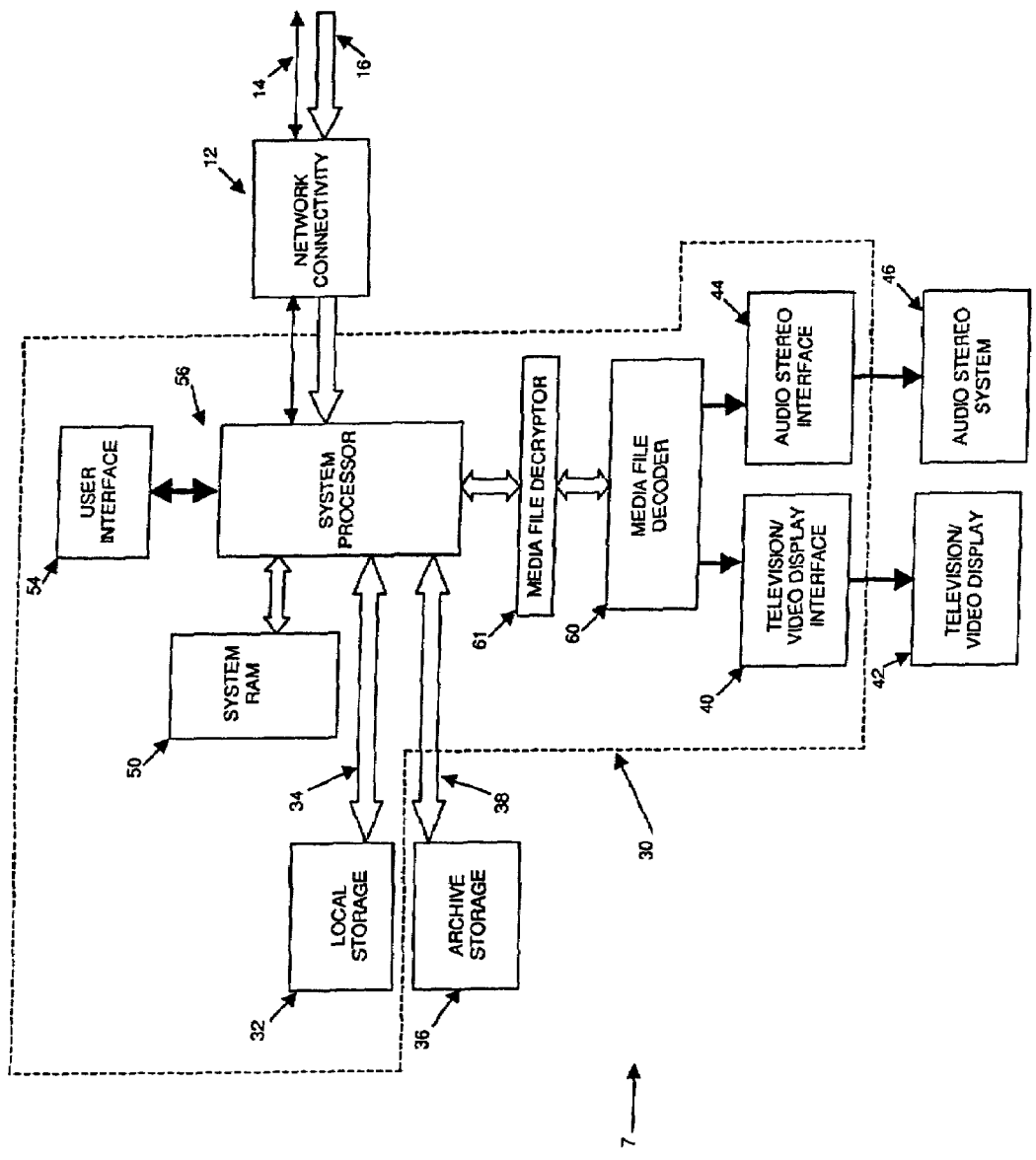
FIG. 2 is a block diagram showing a home user site comprised of a player/receiver subsystem and connectivity to home entertainment system components and the network.

Attention is now directed to FIG. 2 which depicts a preferred home user site 7 comprising a player/receiver subsystem 30. The subsystem 30 includes a local storage device 32, e.g., a hard disk drive, for storing and retrieving media files via a bi-directional path 34. The player/receiver subsystem 30 can also be optionally coupled to an archive storage device 36, e.g., a removable storage medium device, via a bi-directional path 38. Subsystem 30 is also connected via television/video display interface 40 to the input of a conventional television set/video display 42 and via audio stereo interface 44 to a conventional home audio stereo system 46.

The player/receiver subsystem 30 is comprised of a user interface 54, a system processor 56, system RAM 50, a media file decoder 60, a media file decryptor 61, a television/video (NTSC/PAL) display interface 40, and an audio stereo interface 44. The system 30 is connected via network connectivity means 12, which preferably comprises a cable or DSL compliant modem or a VSAT network connectivity device, to the network 11.

Figure 3:
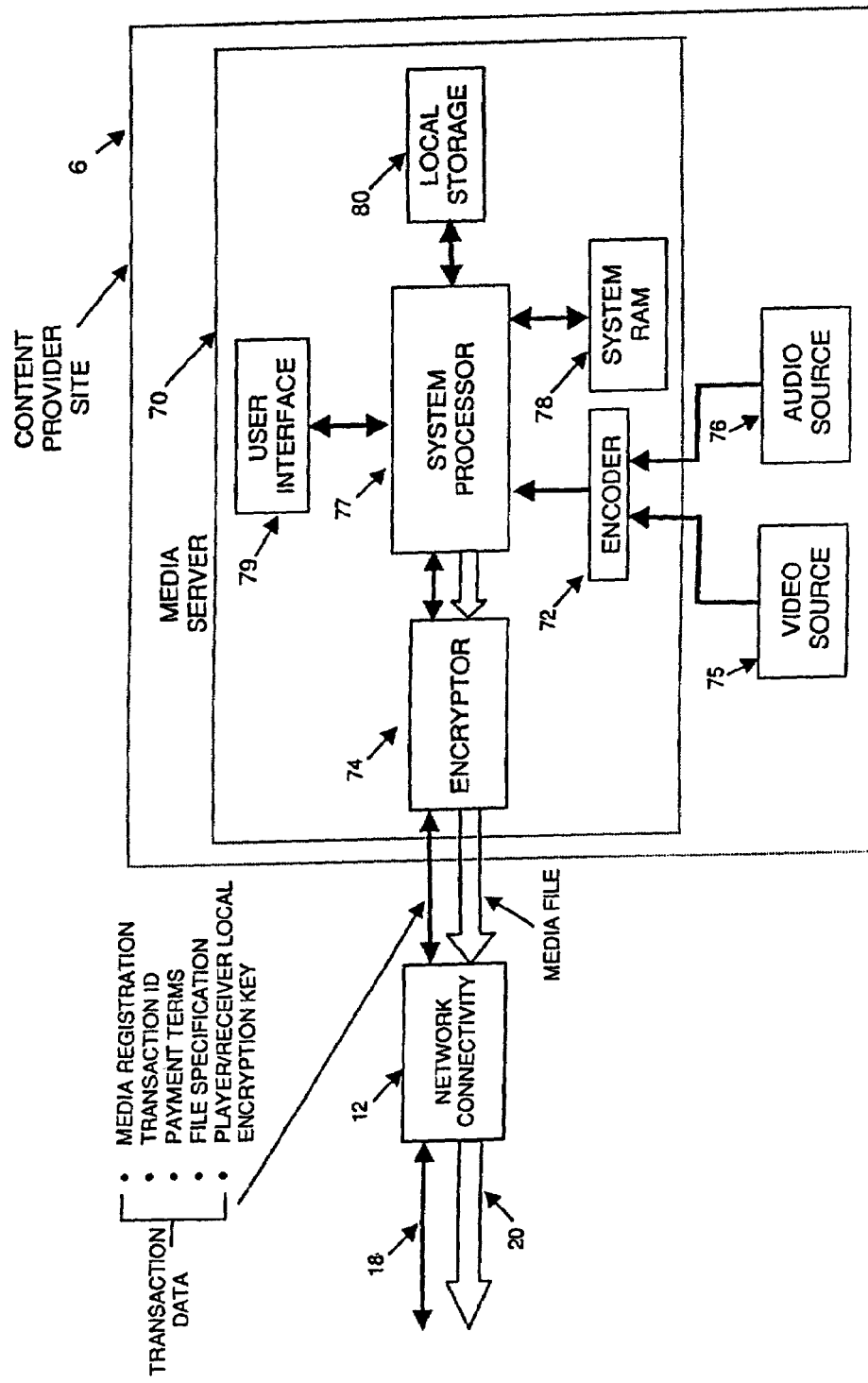
FIG. 3 is a block diagram showing a content provider site comprised of a media server, a file encoder and encryptor and connectivity to video/audio sources and the network.

FIG. 3 depicts a content provider site 6 primarily comprising a media server 70, including a file encoder 72, and a file encryptor 74, a system processor 77, system RAM 78, a user interface 79 and a local storage means 80. A video source 75 and an audio source 76 are coupled to encoder 72. The media server 70 functions generally to supply encoded media files to encryptor 74 for transmission over the network 11. During a typical transaction, the media server 70 receives transaction instruction data from the transaction server 10 via the network 11 and connection 18. Upon response to those instructions the media server locates the requested file in storage means 80 and provides it to the encryptor 74 for encryption. The encryptor 74, utilizing the transaction instruction data including media registration, transaction ID, payment terms, file specification and the requesting player/receiver's local encryption key, encrypts the requested file. This results in the requested file being uniquely dynamically encrypted such that it can only be played back on the requesting player/receiver 30. The encrypted file is then transmitted to the requesting player/receiver via flow path 20 and network 11.

In typical use, when a player/receiver 30 (FIG. 2) is powered on, its system processor 56 instructs its network connectivity means 12 to connect to the transaction server 10. The system processor 56 then transmits a system identifier including a locally generated encryption key and the player/receiver's unique electronic serial number and the users Personal Identification Number (PIN) entered by the user via user interface 54. The transaction server in turn performs an account authentication operation and provides a list of available files and/or updates to the player receiver. The list is automatically generated and customized at the transaction server based on the users' PIN which indicates the user profile. Next, based on selections interactively entered by the user, the player/receiver 30 transmits media file requests to the transaction server 10. The transaction server processes the media requests, generates transaction ID and instruction data and transmits this data along with the local encryption key (received from the requesting player/receiver 30) to the content provider site 6 (FIG. 3) that contains the requested files. Additionally, the transaction server 10 records the transaction for purposes of debiting the user's account and crediting the provider's account. The files are dynamically encrypted at the content provider site by the encryptor 74 using a locally generated encryption key and the encryption key and instructions received from the transaction server. The files are encrypted such that they can be decrypted and played back only on the authenticated requesting player/receiver. The files are then transmitted from the content provider site via the network directly to the requesting player/receiver 30. Direct transmission to the requesting player/receiver is implemented by using its IP address, assuming a typical TCP/IP format. That is, the download instructions received from the transaction server contain the IP address of the requesting player/receiver which is then used by the provider site to download directly to the player/receiver.

The player/receiver then utilizes its local storage means 32 to store the encoded file(s) being received. The archive storage means 36 is used when the user has purchased media files and desires long term storage of those files. During playback by the player/receiver 30, the stored encrypted files are retrieved by processor 56 from the local storage means 32 or archive storage means 36, then decrypted, decoded and transferred via the interface 40 to the television/video display means 42, and/or the interface 44 to the audio system 46. These operations occur automatically in response to media selections made by the user operating the player/receiver 30.

It is to be noted that the media files are automatically downloaded to the player/receiver for storage as an encrypted file on the local storage means 32 or archive storage means 36 for playback at a desired time by the user. This approach makes a potentially unlimited array of media files available to the end user. Further, the system and architecture of the preferred embodiment enable content provider sites 6 to securely encrypt and transmit selected media files to authenticated users via the Internet. Further, due to the dynamic file encryption functionality and the ability of the content provider site encryptor 74 and home user site player receiver 30 to automatically generate unique encryption keys, the system provides a secure electronic commerce system that enables media owners to securely sell or rent media to users. Most importantly, because of the unique dynamic encryption, each copy of a transmitted media file can be played back only on the player/receiver for which it was encrypted, thereby ensuring a secure and profitable transaction between media seller and purchaser.

In the preferred embodiment, at the content provider site 6 (FIG. 3), media files stored on the media server 70 are downloaded to the requesting player/receiver 30 after being encrypted by the encryptor 74 in response to transaction data and instructions received from the transaction server 10. Recorded media files originating from the video source 75 and/or audio source 76 are encoded by the encoder 72 and transferred to the media server 70 for storage. The media server in the preferred embodiment can be a web, FTP or file server. In the preferred embodiment the player/receiver 30 and encoder 72 utilizes a compression/decompression technique conforming to the Moving Pictures Expert Group (MPEG) standard for encoding audio and video files. The standard is divided into three parts that include audio, video and systems. The systems part of the specification handles integration of audio and video streams with time stamping data to enable synchronization of the two. The key benefit of the MPEG format is that it provides a standardized way for various distributed content providers to make video, audio and graphic files available to consumers. However, it should be understood that embodiments of the invention could use various other known compression/decompression formats for audio and/or video. Examples of video compression algorithms are MPEG and Apple Computer's QuickTime. Examples of audio compression algorithms are MP3 (i.e., MPEG, Audio Layer 3) and Microsoft's ASF format.

Figure 4:
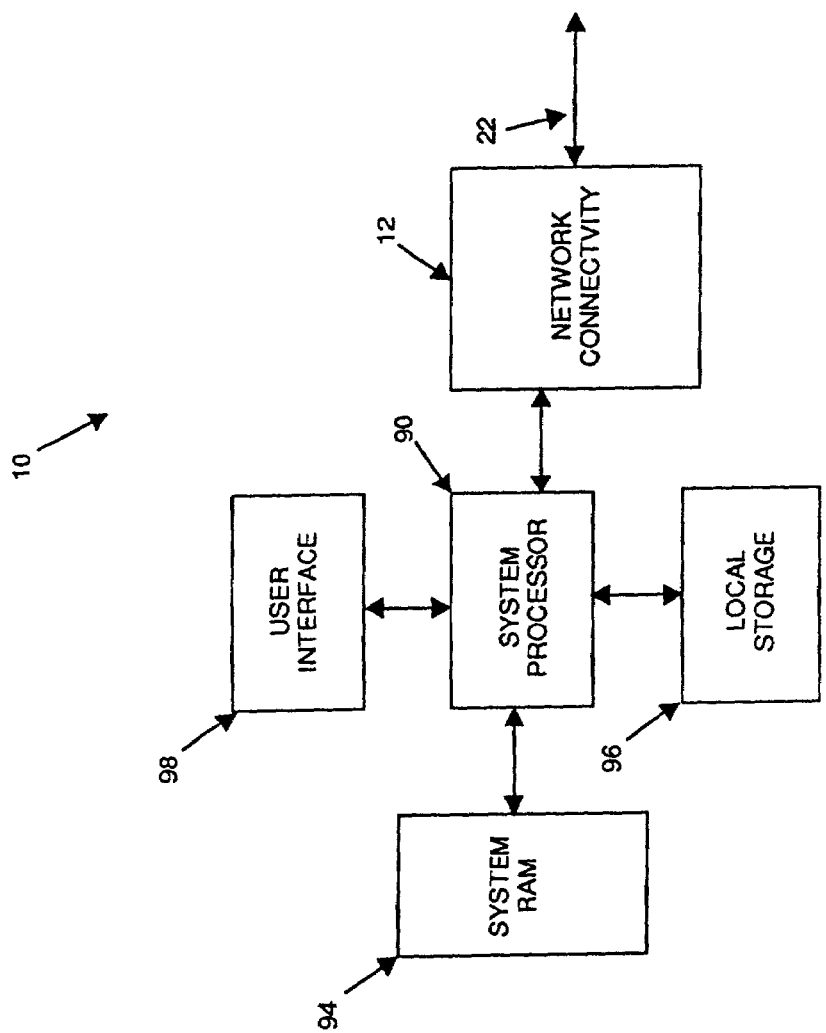
FIG. 4 is a block diagram showing a preferred implementation of a transaction server.

FIG. 4 is a block diagram showing a preferred implementation of the transaction server 10. The transaction server maintains a directory of all currently available media files. When a media request is made by a player/receiver, the media ID is looked up in the directory, which provides the location of a content provider site, whose media server is currently serving the requested media. The directory is designed to allow fast retrieval of information even if the number of available items is large. In the preferred embodiment, the directory may be a hash table, a B-tree or a table in a structured query language [SQL] database such as Oracle or MySQL. For each item in the directory, there may be one or more media servers listed. The media server selected in response to the media file request may be chosen based upon geographic location, current server load or other parameters designed to improve performance or reliability. The media directory also contains other information, such as the provider of the media, its current pricing, use terms and other related data. The transaction server 10 is comprised of a system processor 90, system RAM 94, local storage 96, a user interface 98, and network connectivity device 12. The transaction server 10 receives system identifiers, including electronic serial numbers and encryption keys from player/receivers 30 requesting authentication. The system processor 90 compares those identifiers to a database that stores device identifiers for each player/receiver manufactured. Device identifiers include the electronic serial number of the device and date of manufacture. Upon authentication, the transaction server creates an account number and authentication codes for the device. In addition, a user selected Personal Identification Number [PIN] is also established for the device. During media file downloads, this information is used to create a file header that is associated with each file that is downloaded. This header contains the device authentication codes, user account number, file name, content owner account number, file authentication code, file life, file cost and file size codes.

After authentication, the transaction server 10 transmits a customized list of available files to the requesting player/receiver 30. The list customization is based on the user profile associated with each PIN that is entered into a player/receiver during a transaction session. The transaction server also maintains a database of content provider sites 6 and the content that they retain. When the transaction server 10 receives file requests from a player/receiver 30, its system processor 90 processes the request and checks a database stored on the local storage device 96 for the location of the content provider site that contains the requested file. The system processor 90 then generates a transaction ID and transaction instructions and transmits this transaction data with the requesting player/receiver's local encryption key to the content provider site possessing the requested media file. The requested files are then uniquely encrypted at the content provider site 6 using the local encryption key received from the transaction server 10. As previously mentioned, the encrypted file is then transmitted directly from the content provider site to the requesting player/receiver 30.

Figure 5:
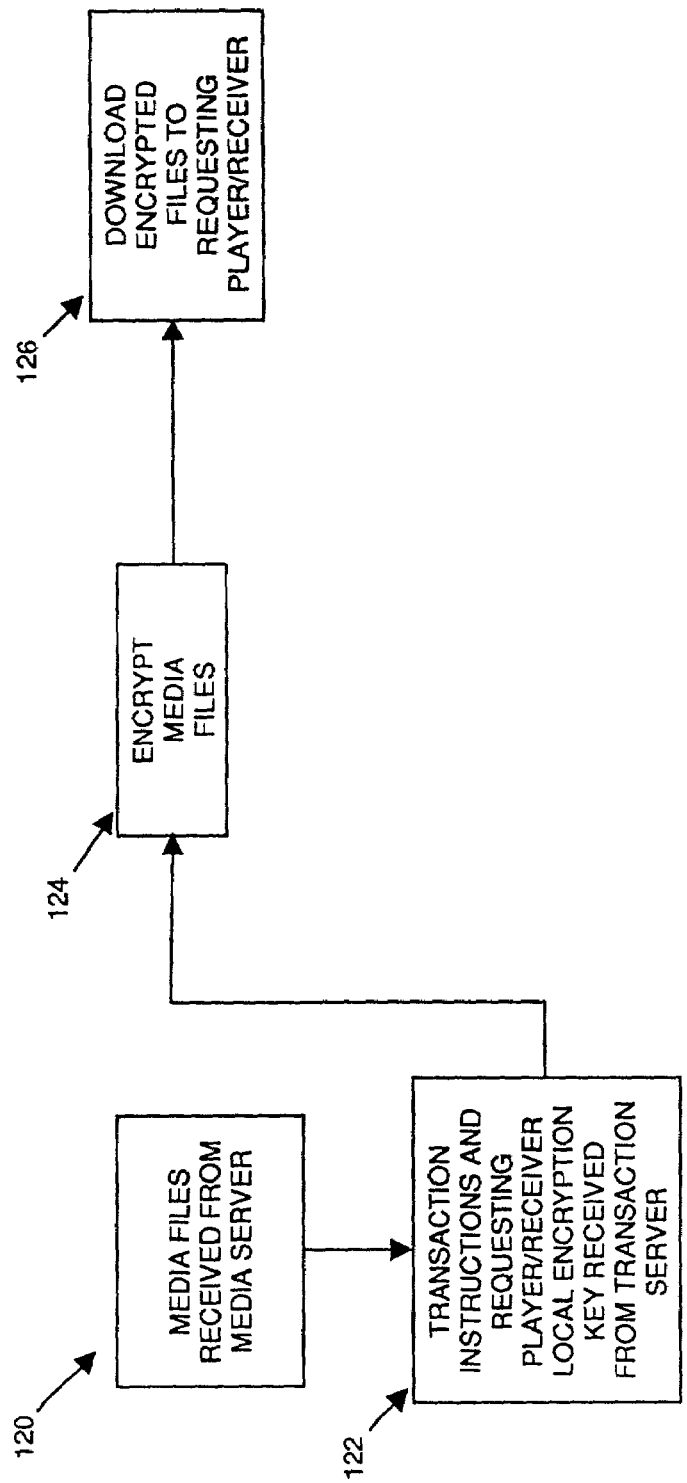
FIG. 5 is a flow chart that illustrates the operation of the encryptor.

FIG. 5 is a flowchart that illustrates a typical operational sequence executed by the media server encryptor 74 (FIG. 3) in performing a media file download initiated by the transaction server 10. The encryptor 74 receives media files from the media server 70 in operation 120. Transaction instructions and the requesting player/receiver's local encryption key are received from the transaction server 10 in operation 122. In operation 124, the requested media files are encrypted. In operation 126, the encrypted files are downloaded via the network to the requesting player/receiver.

Figure 6:
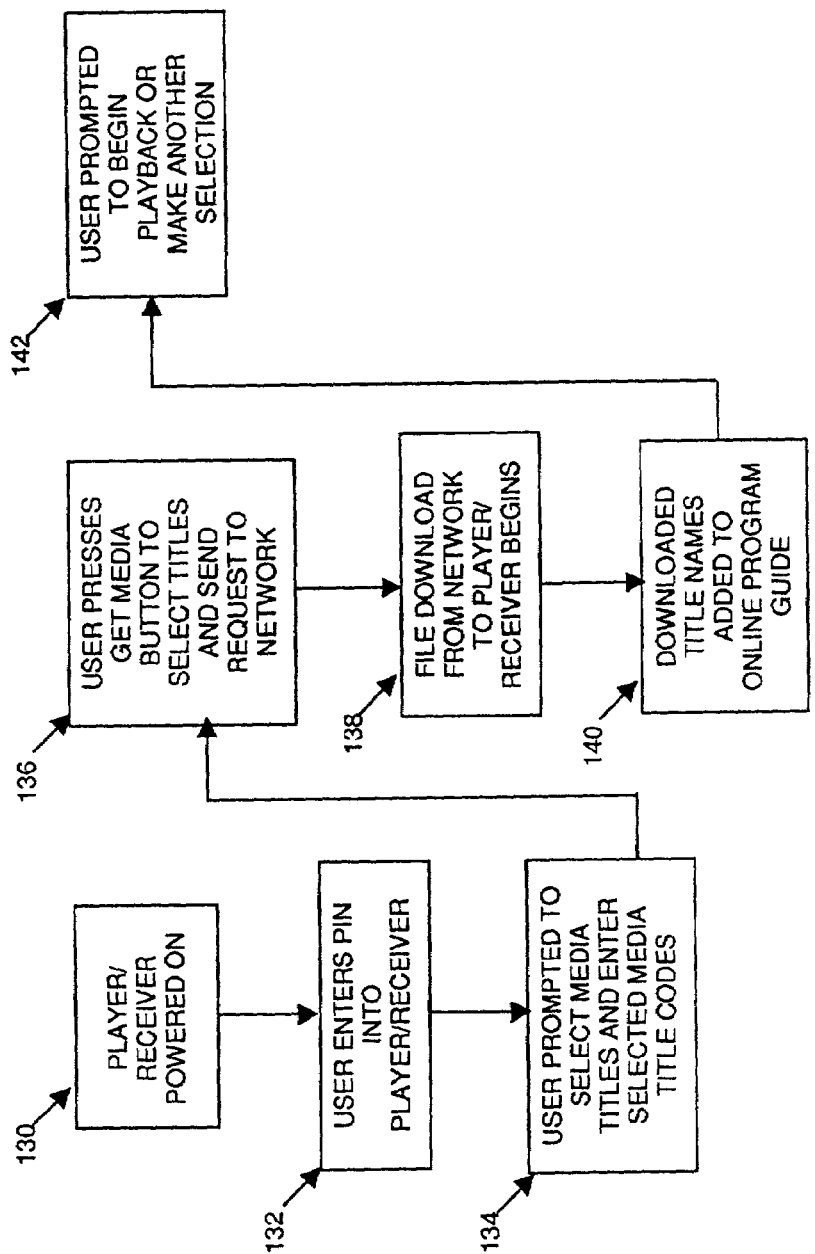
FIG. 6 is a flow chart that illustrates the operation of the player/receiver.

FIG. 6 is a flowchart that illustrates a typical operational sequence executed by the player/receiver 30 during a usage session. After power is applied to the player/receiver in operation 130, the user is prompted to enter a PIN into the player/receiver (operation 132). In operation 134, the user is prompted to select media titles and enter selected media title codes. This is followed by operation 136 where the user presses the GET MEDIA button (FIG. 10) to send a request for the selected titles to the transaction server via the network. In operation 138, the file download from the content provider to the player/receiver begins. In operation 140, the title names of the downloaded files are added to the online program guide. In operation 142, the user is prompted to begin playback of the downloaded file or to make another selection.

Figure 7:
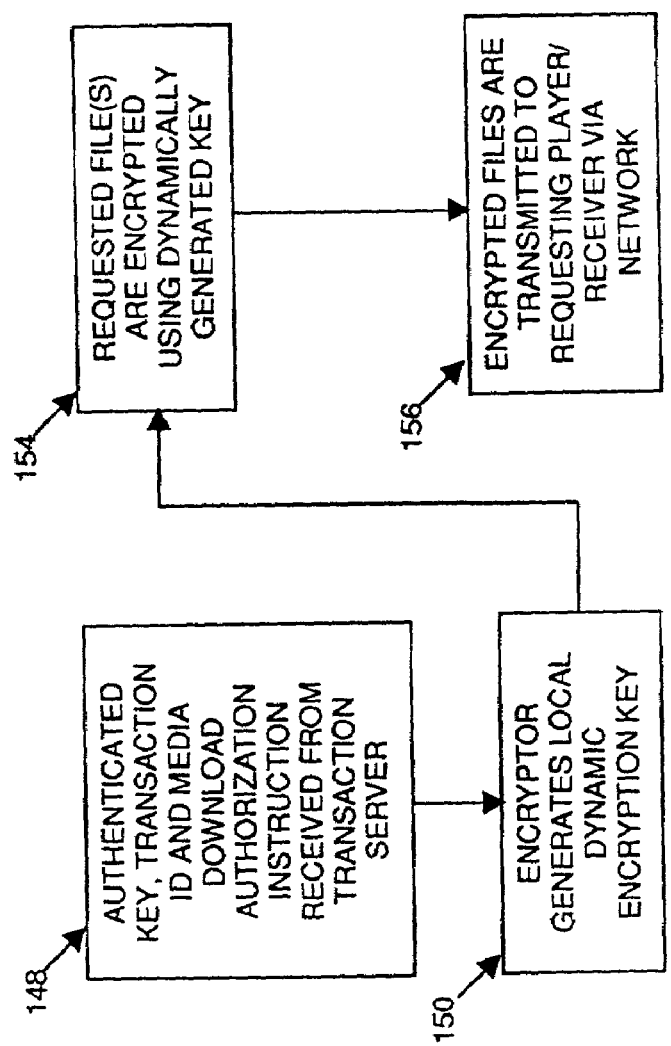
FIG. 7 is a flow chart that shows the automated process of creating unique dynamically encrypted player/receiver specific files in response to file requests.

FIG. 7 is a flowchart that shows the automated process of creating unique dynamically encrypted player/receiver specific files in response to file requests. Media files downloaded from the content provider site are dynamically encrypted before they are transmitted to the player/receiver via the communications network. The encryption process is preferably modular, enabling new algorithms to be used as they become available. Examples of existing encryption algorithms include PGP and the Unix crypt command. The encryption process uses an encryption key provided by the requesting and authenticated player/receiver. This insures that the media files can only be decrypted by the same player/receiver which made the request. In order to provide additional security, all communication between the player/receiver, the media server and the transaction server occurs over secure connections. For example, in one implementation, the network connections may be made using secure socket layer(SSL) technology. This prevents a third party from intercepting keys and other unencrypted information in transit. In operation 148, the media server 70 receives an authenticated player/receiver 30 generated local encryption key, transaction ID and media request from the transaction server 10. In operation 150, the encryptor 40 dynamically generates an encryption key that is local to the media server 70. In operation 154, the requested files are uniquely encrypted for download using the dynamically generated encryptor key and the local encryption key received from the requesting player/receiver 30. In operation 156, the encrypted files are transmitted directly to the requesting player/receiver via the network.

Figure 8A:
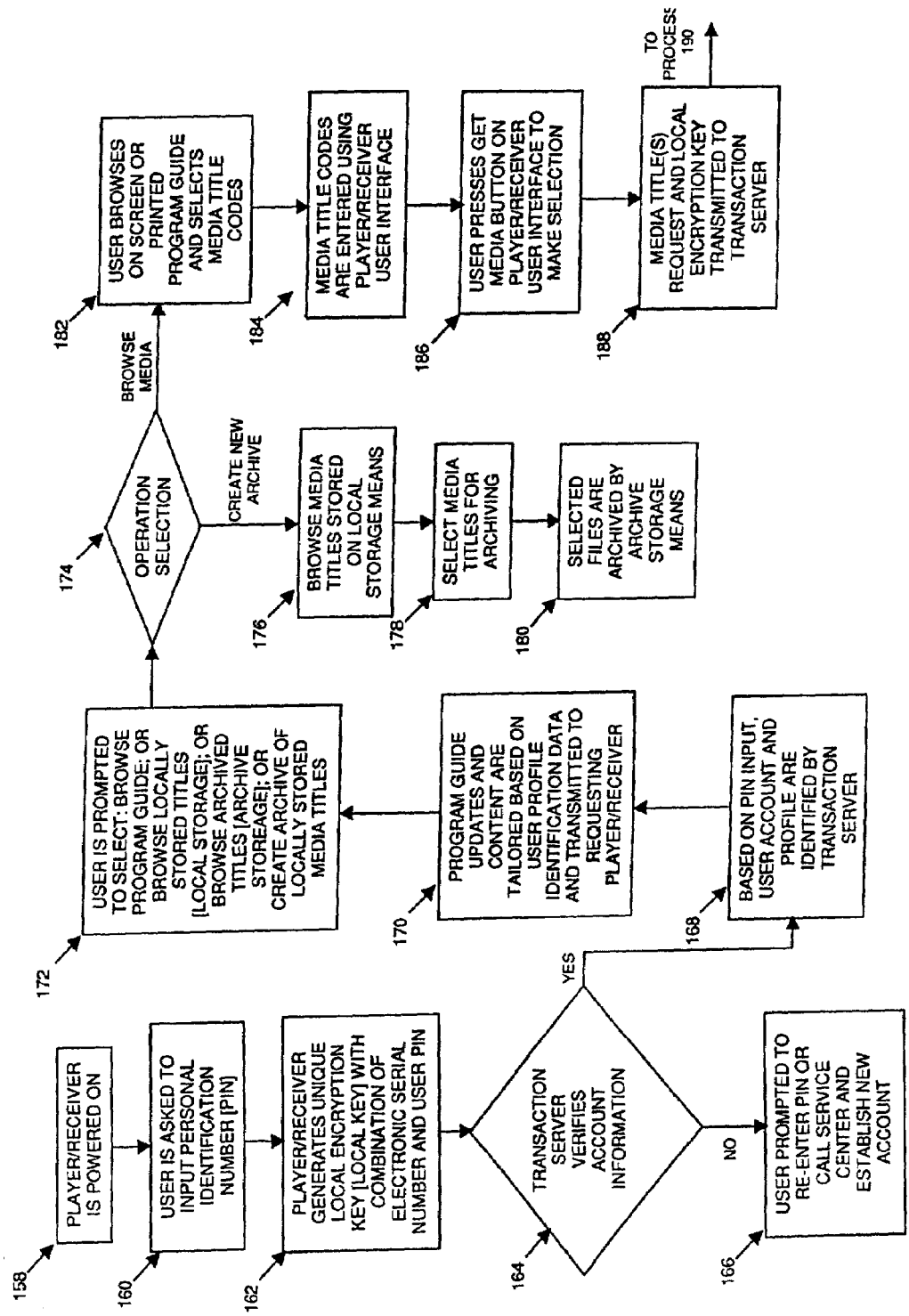
FIGS. 8A and 8B show a preferred embodiment of the functional processes executed by the transaction system.
Figure 8B:
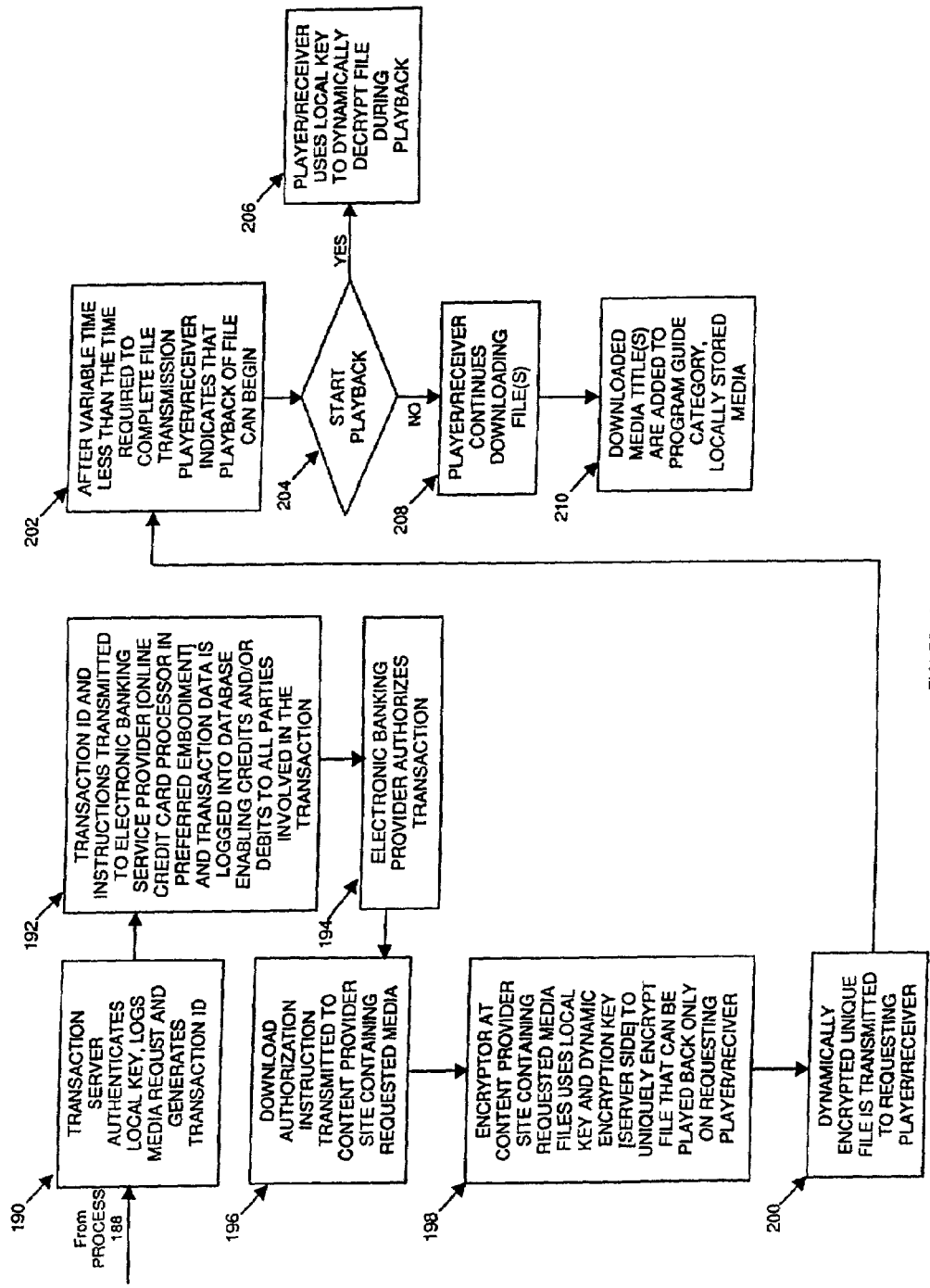

FIGS. 8A and 8B show a preferred implementation of an overall transaction process. The transaction process begins in operation 158 with the player/receiver being powered on. Next, in operation 160, the user is prompted to enter their Personal Identification Number [PIN]. This number is used in conjunction with the player/receiver's electronic serial number to automatically generate a unique local encryption key in operation 162. The PIN is transmitted to the transaction server for verification in operation 164. If the account information is verified, the transaction proceeds to operation 168 and the user is identified by the transaction server. If the PIN is not verified, operation 166 is invoked and the user is asked to call the service center to establish a new account or to re-enter their PIN. In operation 170, the transaction server automatically updates the electronic program guide that is stored on the local storage means 32 of the player/receiver. This update is customized to specific user preferences that are associated with each user account profile. Next, in operation 172, the user is prompted to browse the program guide or to browse titles that are stored locally or on the archive storage means. In operation 172 the user is also asked if they would like to create a new archive. This function enables an encrypted copy of one or more locally stored media titles to be stored on the archive storage means 36. At operation 174, a decision is made to either browse media titles or create a new archive. If create a new archive is selected, the user is prompted to browse locally stored media titles as shown in operation 176. This is followed by the selection of the media titles to archive as indicated by operation 178. In operation 180, the selected files are archived by the archive storage means. If the user chooses to browse media for download and/or playback, the transaction proceeds to operation 182 and the user browses the on screen or printed program guide and selects media title codes. This is followed by operation 184 where the media title codes are entered using the player/receiver user interface of FIG. 10 (or an equivalent remote control) to make the selection 186. At operation 188, the media title(s) request and local unique encryption key are transmitted to the transaction server. Next, in operation 190, the transaction server authenticates the local key, logs the media request and generates a transaction ID. In operation 192, the transaction ID and instructions are transmitted to the electronic banking services provider, a credit card processor in the preferred embodiment, and the transaction is logged into a database enabling credits and/or debits to the accounts of all parties involved in the transaction. In operation 194, the electronic banking provider authorizes the transaction. This is followed by the transmission of the download authorization instruction from the transaction server 10 to the content provider site 6 containing the requested media file as shown in operation 196. At operation 198, the encryptor 74 at the content provider site containing the requested media files uses the locally generated player/receiver key it received from the transaction server and a dynamic encryption key generated by the encryptor 74 to uniquely encrypt the requested file(s) so that they can be played back only on the requesting player/receiver. In operation 200, the dynamically encrypted file is transmitted to the requesting player/receiver. During the transmission process, after a variable time that is less than the total time required to transmit the file, the player/receiver indicates that playback of the file can begin as shown in operation 202. The user may decide, as indicated at decision operation 204, to initiate playback or allow the download process to continue to completion as indicated by operation 208. If the user decides to start the playback, the player/receiver uses its local encryption key to dynamically decrypt the file during playback as shown in operation 206. If the user allows the complete file to download prior to initiating playback, the download process continues as indicated by operation 208. At the completion of the download process, the new media titles are automatically added to the program guide category, locally stored media as indicated by operation 210.

Figure 9:
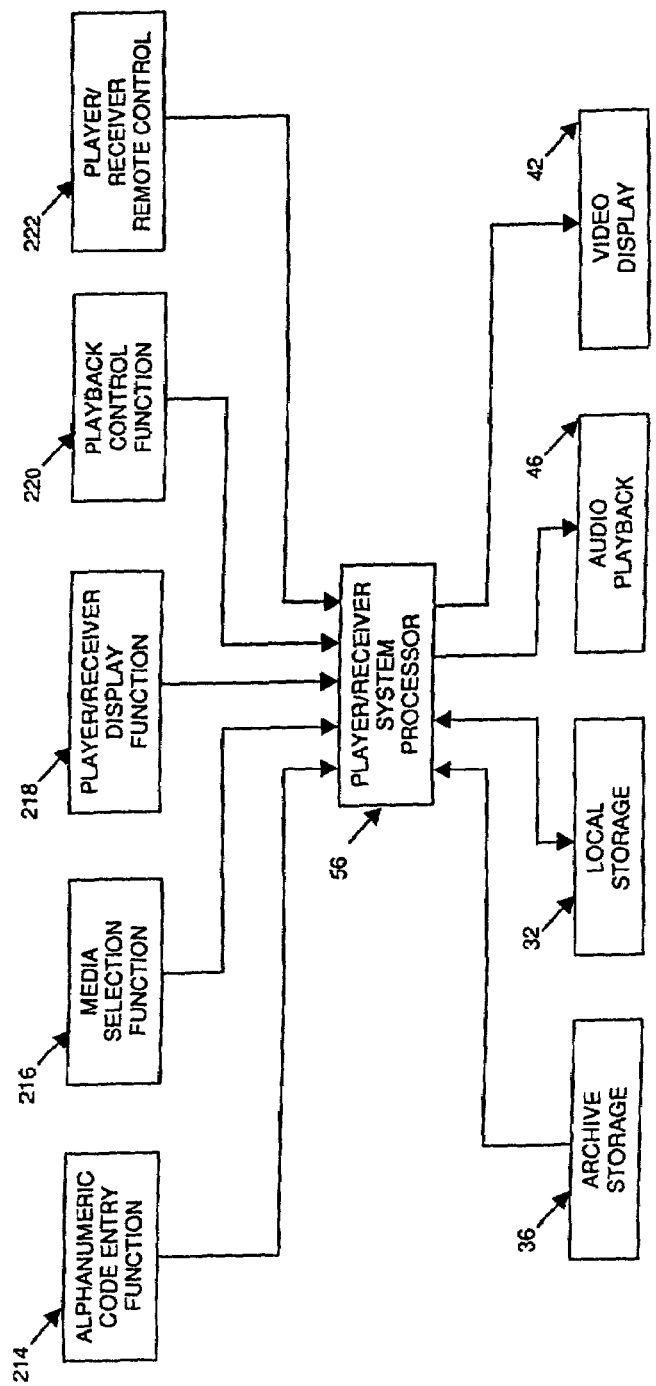
FIG. 9 is a functional diagram that describes the preferred embodiment user interface of the player/receiver.

FIG. 9 is a functional diagram that describes the preferred embodiment user interface 54 of the player/receiver 30. The user interface includes an alphanumeric code entry function 214, a media selection function 216 (GET MEDIA button in FIG. 10), a display function (e.g., display 236 in FIG. 10) 218, playback control functions 220 (e.g., tape transport style buttons 238 in FIG. 10) and a hand held remote control 222 that replicates the player/receiver user interface functionality. The user enters media title codes, personal identification numbers and other alphanumeric information using the code entry function 214. These codes and other command entries are processed by the player/receiver system processor 56. Media selections and command confirmations are entered using the media selection function 216. Playback of media stored on the local storage means 32 or archival storage means 36 is controlled via the playback control functions 220 or the remote control, functionality 222 to drive the television/video display 42 and/or the audio system 46 respectively.

Figure 10:
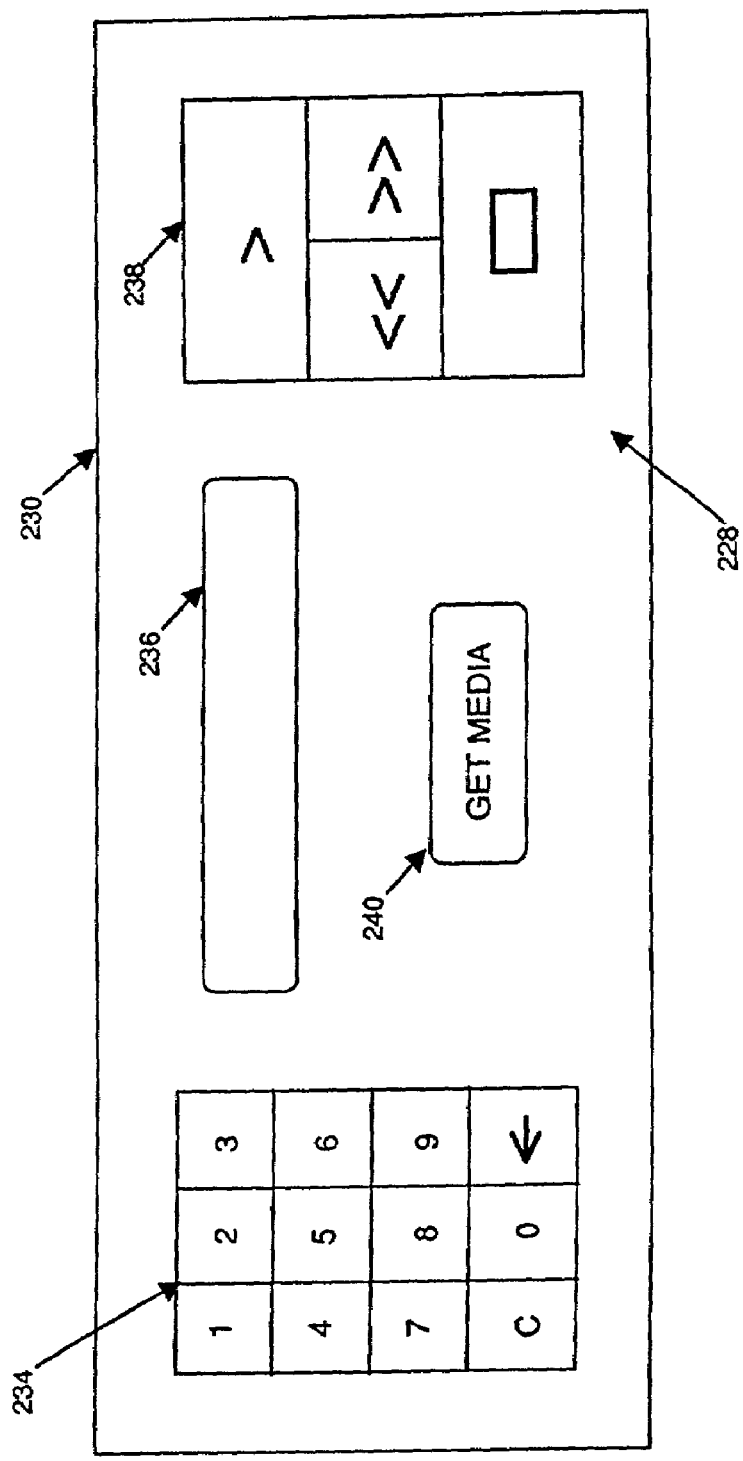
FIG. 10 shows a preferred embodiment of the front panel of a player/receiver forming the user interface.

FIG. 10 shows a preferred embodiment of the front panel 228 of a player receiver unit enclosure 230 forming the user interface 54 for the player/receiver 30. The keypad array 234 implements the code entry functionality 214 used to enter the users Personal Identification Number and media title codes as well as product or service selections made available via the player/receiver. The display means 236 (e.g., a vacuum fluorescent display) is used to show the status of the player/receiver, its current operations and to provide feedback for the user as commands are entered via the player/receiver user interface or the player/receiver remote. Information as to the status of the player/receiver as well as the functions and media selections being entered and the browseable online program guide are also viewable via the display 236. The GET MEDIA button 240 is used to request download of a selected media file to the player/receiver. Upon receipt of a media file by the player/receiver, the buttons 238 are used to control playback of the file. In the preferred embodiment, these functions include play, stop, rewind and fast forward. The enclosure 230 is intended to typically house the components of the player/receiver subsystem 30 depicted in FIG. 2.

Figure 11:
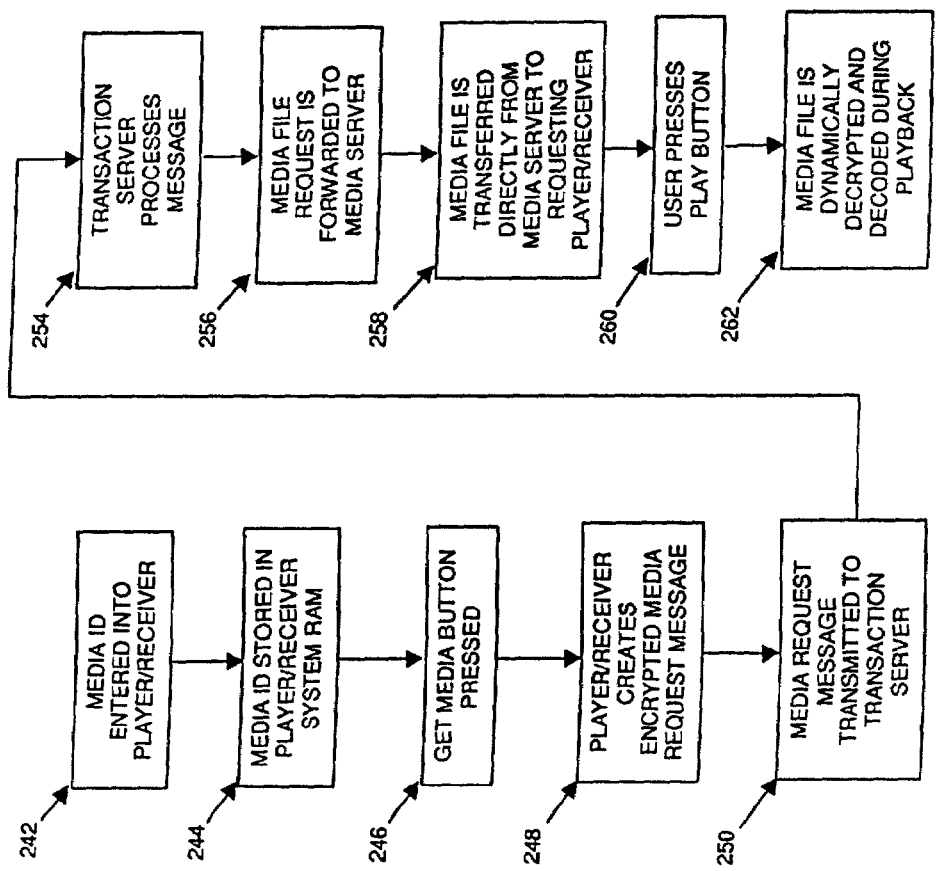
FIG. 11 is a more detailed flow chart of FIG. 6 showing a preferred embodiment of the software processes executed by the player/receiver user interface.

FIG. 11 shows the preferred embodiment of the software processes executed by the player/receiver in response to buttons pressed on the player/receiver's front panel. The invention provides an easy to use interface for requesting media. In the preferred embodiment, the user enters a media ID into the player/receiver and presses the "Get Media" button to initiate automatic downloading to the player/receiver. When "Get Media" is pressed, the player/receiver sends a message to the transaction server identifying the desired media ID and information uniquely identifying the player/receiver, such as its serial number, the user's personal identification number and the player/receiver's local encryption key. The transaction server looks up the desired media ID and forwards the request to one of the media servers currently serving the requested media, which then dynamically encrypts and transfers the media file directly to the player/receiver. In operation 242, the user enters the desired media file ID number into the player/receiver. This number is stored in the player/receiver's system RAM as shown in operation 244. At operation 246, the user presses the Get Media button which initiates operation 248. In operation 248, the player/receiver creates an encrypted media request message that contains the media ID, player/receiver serial number, user PIN and related transaction data. This message is transmitted via the communications network to the transaction server as indicated by operation 250. At operation 254, the transaction server processes the request and in operation 256 forwards that request to the appropriate media server containing the requested file. In operation 258, the media file is transferred directly from the media server to the requesting player/receiver. When the user presses the play button on the player/receiver as indicated by operation 260, the player/receiver initiates operation 262. In operation 262, the file is dynamically decrypted and decoded during playback to enable viewing and or listening of the file using standard home entertainment systems including televisions and audio systems.

Figure 12:
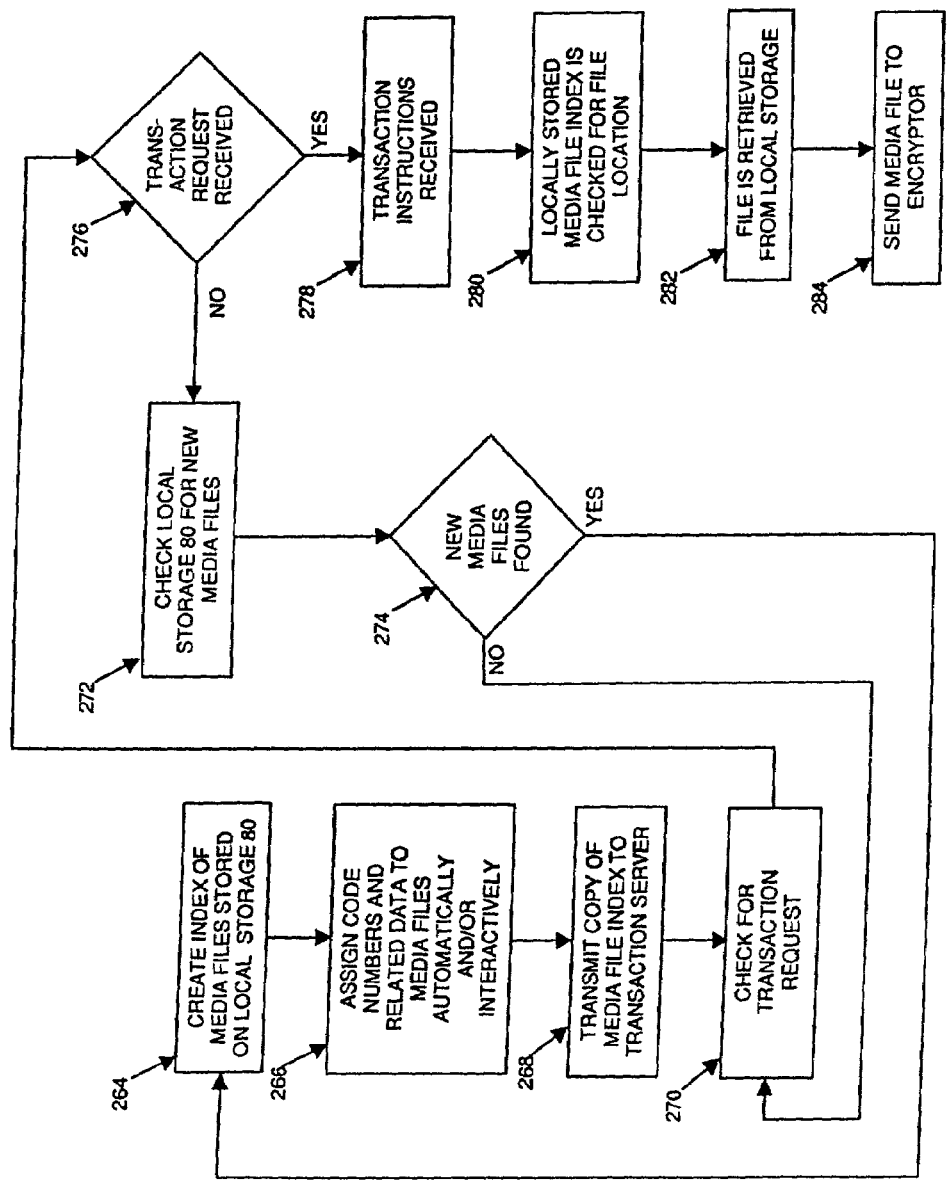
FIG. 12 is a flow chart that shows the functional operation of the media server software.

FIG. 12 describes the operation of the software executed by the media server processor 77. Specifically, in the preferred embodiment the media server software creates an index of media files stored on the local storage means 80, as indicated by operation 264 and fulfills media file requests received from the transaction server. At operation 266, the software automatically and/or interactively assigns code numbers and related data to the locally stored media files. The resultant media file index is transmitted to the transaction server 10 in operation 268. Thereafter, as previously described, the processor 77 checks for transaction requests, as indicated in operation 270. After a transaction request is recognized (operation 276), the download authorization instruction is accepted in operation 278. In response to the instruction, the locally stored media file index is checked for the requested file (operation 280). Then in operations 282 and 284 the file is retrieved from the media server's local storage 80 and sent to the encryptor 74. If no transaction request is received in operation 276, then the media server automatically and/or interactively checks local storage for new media files, as shown in operation 272. At operation 274, if new media files are found, the media server returns to operation 264 to initiate indexing of the new media files. If no new media files are found, the media server returns to operation 270 and continues checking for transaction requests.

From the foregoing, it should now be apparent that a method and system have been disclosed for enabling a home user to request media files via a user friendly player/receiver and for such media files to be downloaded from a content provider site via a communications network for playback on a conventional television set and/or audio system at the home user site. The system includes a transaction server which responds to the user request to authenticate the user and provide authorization instructions to the content provider site to encrypt encoded media files and transmit them via the network for playback only at the requesting authenticated site.

Although a preferred embodiment has been disclosed herein, it is recognized that modifications and variations within the spirit of the invention may readily occur to those skilled in the art, and it is expressly intended that such fall within the scope of the appended claims.

We claim:

1. A system for executing user transaction requests for delivering digital media files via the Internet for driving a user site television set and/or audio equipment, said system comprising:
   a plurality of user sites, each user site including a player/receiver, a television set and/or audio equipment, and a connectivity device for connecting said player/receiver to the Internet;
   a plurality of provider sites, each provider site including a media server comprising a media file storage device and a media file encryptor, and a connectivity device for connecting said provider site media server to the Internet;
   a transaction server and a connectivity device for connecting said transaction server to the Internet;
   each said player/receiver including a user interface for sending a media file request via the Internet to said transaction server requesting delivery of an identified media file;
   said transaction server being responsive to a received media file request for sending an authorization to the provider site storing the requested media file authorizing delivery of the requested media file from said provider site to the requesting player/receiver directly via the Internet;
   said authorized provider site being responsive to said transaction server authorization for uniquely encrypting the identified media file and for downloading the encrypted media file directly via the Internet to said requesting player/receiver;
   each said player/receiver including a media file decryptor; and wherein
   only said requesting player/receiver decryptor is capable of decrypting said encrypted media file downloaded thereto for playback on the television set and/or audio equipment at the same user site.

2. The system of claim 1 wherein said provider site encrypts said media file using a unique encryption key and wherein said requesting player/receiver decrypts said media file using a matching encryption key.

3. The system of claim 1 wherein each media file request sent by said player/receiver includes an encryption key; and wherein
   said authorization sent by said transaction server includes said encryption key; and wherein
   said authorized provider site encrypts said media file using said encryption key.

4. The system of claim 1 wherein each media file request sent by said player/receiver includes a unique dynamically generated encryption key; and wherein
   said authorization sent by said transaction server includes said encryption key; and wherein
   said authorized provider site uses said encryption key to dynamically encrypt said media file concurrently with downloading said file to said requesting player/receiver.

5. The system of claim 4 wherein said requesting player/receiver uses said encryption key to dynamically decrypt said encrypted media file downloaded thereto concurrently with playing back said file on said television set and/or audio equipment.

6. The system of claim 1 wherein said requesting player/receiver plays back said media file on said television set and/or audio equipment concurrently with said decryptor decrypting said media file.

7. The system of claim 1 wherein each player/receiver includes:
   a digital storage device for storing downloaded encrypted media files; and a user interface for accessing a stored encrypted media file and for controlling playback of said accessed file.

8. The system of claim 7 wherein each user interface controls playback of an accessed media file by causing its associated media file decryptor to decrypt the accessed file concurrently with playing back the file on the television set and/or audio equipment at the same user site.

9. The system of claim 7 wherein each said player/receiver includes means for displaying a program guide listing media files stored by the digital storage device therein.

10. The system of claim 1 wherein said transaction-server generates a program guide listing media files stored on said provider site media file storage devices; and means at each of said user sites for displaying said program guide.

11. The system of claim 10 wherein said transaction server customizes the program guide displayed at each user site based on profile data collected from the respective player/receiver at each user site.

12. The system of claim 1 wherein each media file request includes user identification data; and wherein said transaction server responds to receipt of said user identification data for verifying account status for the identified user.

13. The system of claim 1 wherein said transaction server selectively responds to a media file request by initiating an electronic banking transaction to debit a user account and/or credit a provider account.

14. A method for executing user transaction requests for delivering digital media files via the Internet for driving a user site television set and/or audio equipment comprising the steps of:
   enabling each of a plurality of users to generate a transaction request including user identification information and media file identification information;
   communicating each transaction request via the Internet to a transaction server;
   causing said transaction server to verify said user identification information and identify which of a plurality of media servers stores the identified media file;
   enabling said transaction server to instruct the identified media server via the Internet to download the identified media file to the requesting user directly via the Internet;
   causing said identified media server to uniquely encrypt the identified media file and download it directly via the Internet to the requesting user; and
   enabling only the requesting user to decrypt said encrypted media file for playback on a television set and/or audio equipment at the requesting user's site.

15. The method of claim 14 wherein said step of generating a transaction request includes generating an encryption key; and including the further step of: causing said transaction server to send said encryption key to said identified media server.

16. The method of claim 15 wherein said step of encrypting said identified media file includes using said encryption key to uniquely encrypt said identified media file.

17. The method of claim 15 wherein said step of generating an encryption key includes the step of generating a unique key for each different transaction request.

18. The method of claim 16 wherein said step of decrypting includes using said encryption key to decrypt said identified media file.

19. The method of claim 14 further including:
   enabling each user to store one or more encrypted media files downloaded thereto; and
enabling each user to play back a stored media file on a television set and/or audio equipment concurrently with decrypting that file.

20. The method of claim 19 including a further step of displaying a program guide for identifying user stored media files.

21. The method of claim 14 including a further step of displaying a program guide for each user identifying media files stored on multiple media servers.

22. The method of claim 21 including a further step of customizing each program guide displayed to a user based on profile data collected from that user.

23. The method of claim 14 including a further step of causing said transaction server to selectively initiate an electronic banking transaction with respect to each transaction request to debit a user account and/or credit a media server account.

* * * * *